United States Patent
Chevalier

[11] 3,897,844
[45] Aug. 5, 1975

[54] SUSPENSION MODIFYING MEANS FOR LEAF SPRING SUSPENSIONS

[76] Inventor: Harold Ross Chevalier, 8640-125th Ave., Edmonton, Alberta, Canada

[22] Filed: Dec. 15, 1971

[21] Appl. No.: 208,323

[52] U.S. Cl. ............... 180/71; 267/66; 280/124 R
[51] Int. Cl. .................................................... F16f 1/22
[58] Field of Search.......... 180/71, 73 R, 75, 73 TL, 180/73 TT; 267/66; 280/124 R

[56] References Cited
UNITED STATES PATENTS
3,704,876  12/1972  Schubeck .................... 180/71 X

*Primary Examiner*—Philip Goodman

[57] ABSTRACT

Suspension modifying devices for use with conventional semi-elliptical spring suspension systems of motor vehicles having transverse powered rear axles comprise a pair of more or less rigid cantilever beams which are mounted either permanently or demountably on the axle housing to extend forwardly, having their free ends directly underneath a forward portion of the associated spring. A large torque applied to the rear wheels through the conventional longitudinal drive shaft ordinarily causes periodic "S" deformation of the leaf spring, leading to vertical oscillation of the entire axle housing, wheels, and spring systems commonly termed "wheel hop." The action of the beams is to direct vertical force upwardly upon engagement of each beam with the spring stack in response to application of drive torque, tending to lift the forward end of the vehicle and to transfer more of the vehicle weight to the rear wheels. By regulating the engagement made at respective beam ends with the leaf springs, torque-induced lifting of one wheel is counteracted. Improved traction and ride result, without impairment of up-down flexing.

Embodiments include spring bars, channel section beams, and compound beams with lower compression element and upper rod tension elements.

14 Claims, 9 Drawing Figures

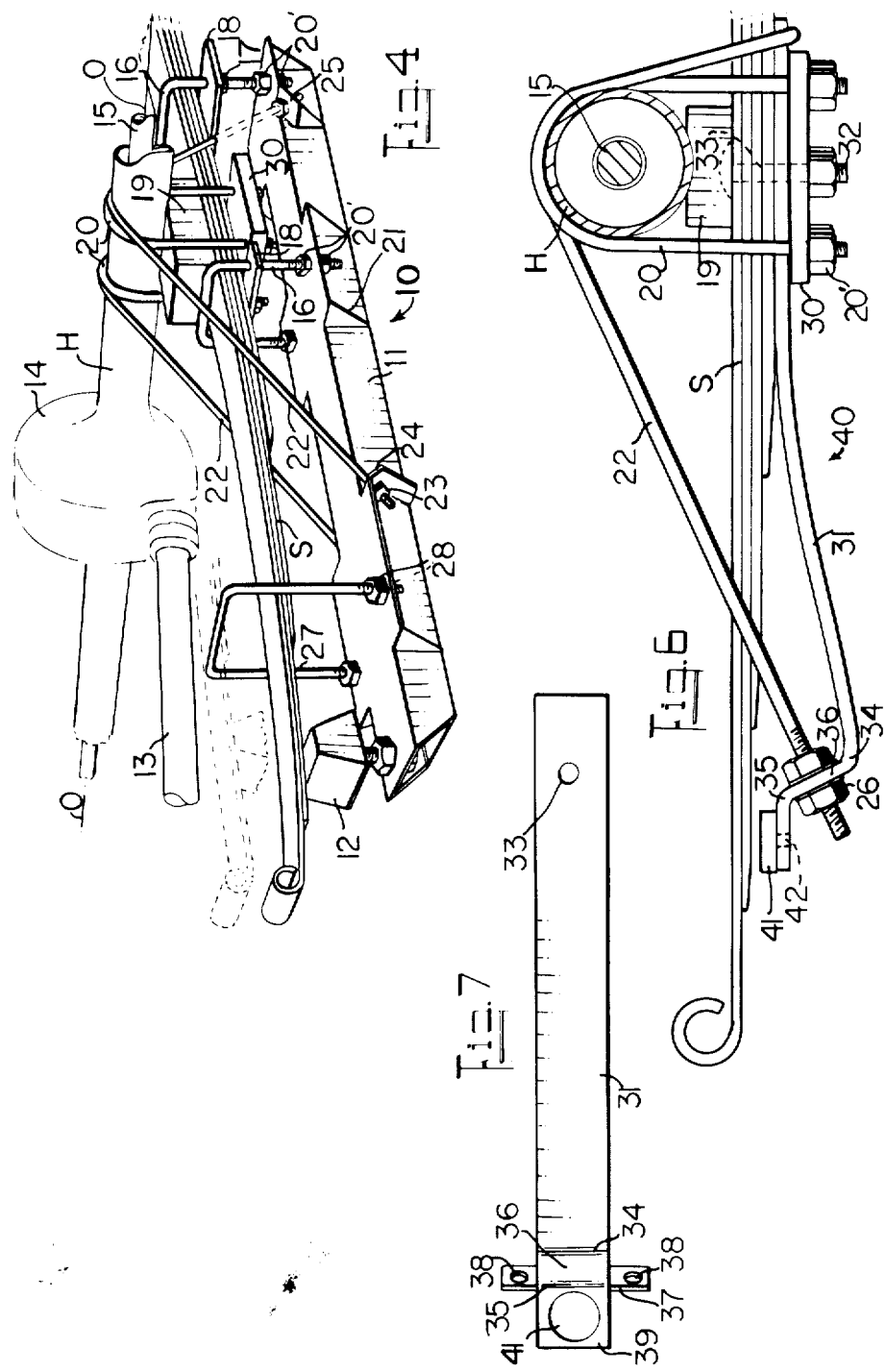

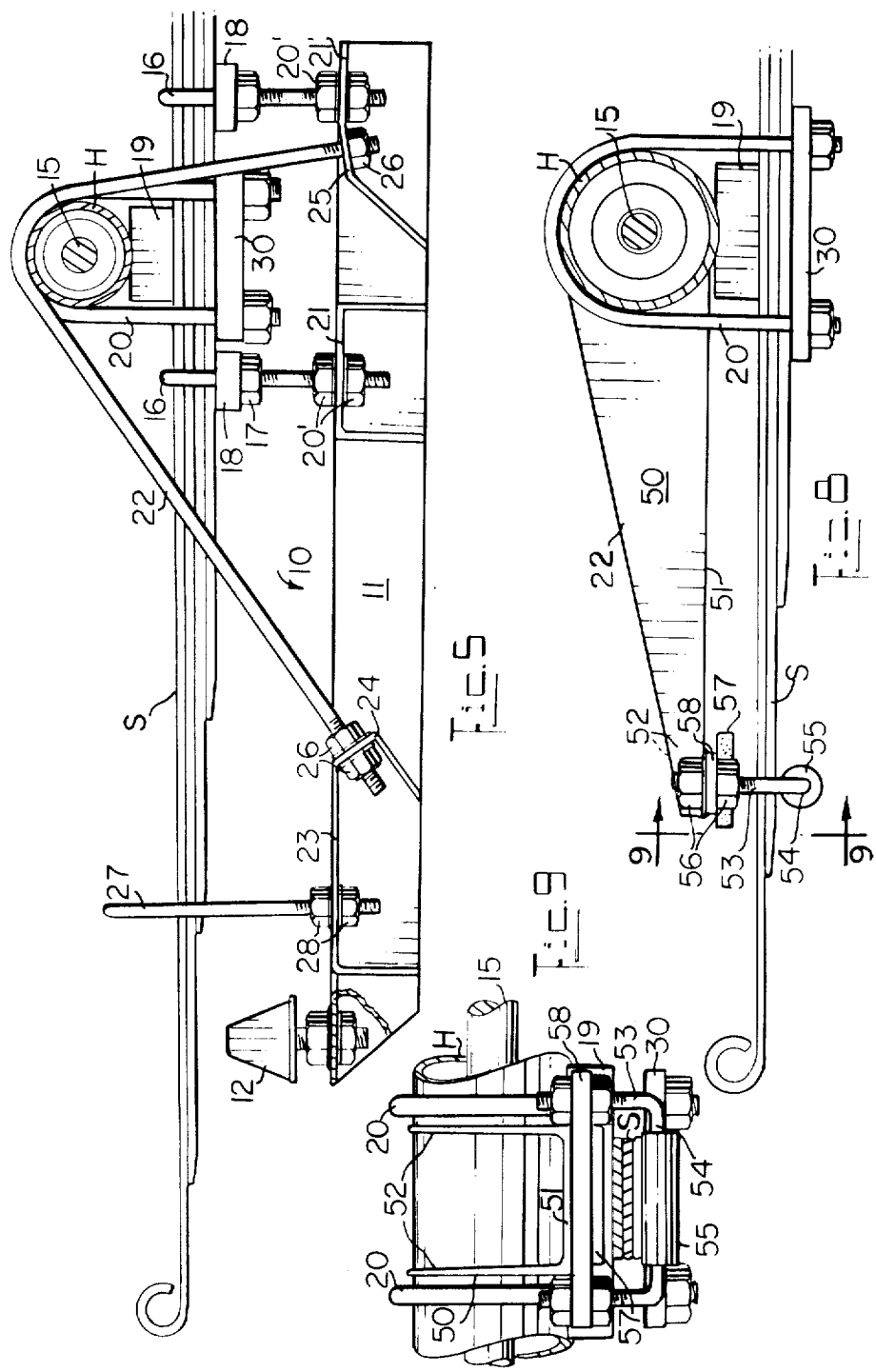

3,897,844

SUSPENSION MODIFYING MEANS FOR LEAF SPRING SUSPENSIONS

This invention relates to automotive suspension systems, and more specifically concerns improved suspension linkages for coupling a vehicle frame through a pair of elliptical leaf springs with a transverse drive axle housing, for the purpose of gaining superior acceleration and minimizing oscillatory disturbances commonly referred to as "wheel hop."

In automotive vehicles having a drive train including longitudinal drive shaft means coupled to a pair of rear axles through a differential gearing, application of drive torque develops reactions tending to rotate the rear axle housing about two horizontal axes. A first rotational axis is longitudinal and intersects the center of the housing and the second axis is transverse and concentric with the axles. Depending on the magnitude of the torque, which may be extremely large in engines of large displacement, one of the rear wheels may be lifted clear of theroad, while the front end of the car will also tend to be lifted. Because of the mass of the axle housing and wheels, and the resilience of the coupling between the vehicle body and the axle housing, complicated disturbances are experienced, including "wrap-up" of the springs due to housing rotation, "squat" of the rear end of the vehicle due to front-end lifting, and tilting of the vehicle frame toward one side. An even more serious phenomenon occurs when achieving maximum acceleration under application of large torque, causing lifting of one rear wheel to such extent as to lose traction and spin, setting up recurrent, periodic lifting and dropping of the affected wheel, i.e. "wheel hop." Not only is this damaging to the tire surface, the drive train, and the differential gearing, but acceleration is degraded, and steering control of the vehicle is poor due to the uncentered forward thrust generated by only one rear wheel and due to the cyclic character of the impulse exerted by such wheel.

Heretofore, numerous approaches have been followed in modifying suspension systems employing leaf springs for various purposes. One prior art construction for preventing spring "wrap - up" arranges a stiff element in the form of a beam forwardly under each leaf spring, as in Canadian Pat. No. 571,018 to Tatum, the beam being pivotedly secured by its ends to the axle housing and to the vehicle frame. This arrangement compels the axle housing to swing about the forward pivot and thus avoids housing rotation about the transverse axis on application of torque but fails to compensate for the transfer of vehicle weight mainly to one rear wheel, and somewhat impairs the ride. In recent prior art approaches for avoiding rear-end "squat" a device known in the trade as "LIFT" bar has been proposed to be secured under the axle housing and clamped under a portion of the forward half of the leaf spring. The bars effectively transfer weight from the front end of the vehicle to the rear wheels as torque is applied while holding the chassis up, but the ride is impaired due to the rigidifying of part of each leaf spring. Moreover no compensation is provided to correct for housing rotation about the longitudinal axis causing unloading of one drive wheel, hence the chief cause of wheel hop is not attacked and the problem not alleviated. The prior art has evidently not proposed any arrangements of leaf spring couplings between a chassis and a drive axle housing such as to provide relief from the disturbances arising out of the compound rotations experienced by the housing.

The present invention seeks to improve on prior art suspension linkages and to this end provides novel suspension modifications which prevent squat and provide correction of lifting of one rear wheel and tilting of the frame to one side under application of large torque to the rear axles, in such manner as to equalize road contact pressures of both rear wheels despite the compound rotations of the axle housing referred to, with no impairment of ride. Essentially the invention consists in the provision of a pair of cantilever beams whether of one-piece or built-up construction, one being located in the plane of each leaf spring, and secured fast to the axle housings, the free end of each beam being adjustably located with respect to the forward portion of the associated leaf spring. The adjustment is preferably so arranged that rotation of the axle housing about each of the two axes as described causes engagement of one beam end with the leaf spring and application of vertical force thereto in a manner compensating for the lift of the associated rear wheel. As a result of the engagement increased weighting of that wheel, and equalization of road thrust developed by each wheel is made possible.

In carrying the invention into effect as a preferred embodiment, each beam comprises a dismountably mountable compound device consisting in an upper tension member and a more or less rigid lower compression member joined at their one ends with the axle housing or with connecting means attaching the leaf stack thereto, and having their other ends connected together remote from the axle housing and carrying resilient block means adjustably disposed adjacent the under-surface of the forward portion of the associated leaf spring. The adjustment of spacing of respective resilient blocks carried by the left and right rear wheel leaf springs is so arranged that under the condition when a certain torque is applied to the rear axles, causing the housing to rotate slightly about the transverse horizontal axis, one beam will engage its block with the associated leaf spring to cause transfer of vertical force to the vehicle frame. In a typical automobile having the drive shaft rotation in clockwise sense as viewed from the forward end of the vehicle, it is the right beam which will be adjusted to engage the spring earlier in response to a small rotation about the transverse axis. At the same time the housing rotation about the longitudinal axis, which tends in the anti-clockwise direction as viewed from the rear, will be opposed by engagement of the resilient block means with the leaf spring, thus offsetting the tilting of the right side of the vehicle body downwardly.

An appropriate adjustment can be readily found enabling the right rear wheel to be loaded as desired for equalizing the thrust by each.

According to an alternative embodiment of the invention, each cantilever beam element preferably consists in a more or less rigid integral member permanently secured, as by welding, to the axle housing and extending forwardly therefrom, carrying a resilient block adjustably positioned with respect to the under surface of the associated leaf spring. Such beam element may be itself resilient.

The invention has utility primarily, but not exclusively, in the sport of car racing where an objective is to traverse a fixed distance from a standing start in minimum elapsed time. Optimum results depend on transferring the entire vehicle weight equally to both rear wheels throughout the greater part of such race to obtain maximum ground thrust and acceleration. Since the front wheels may be almost wholly unloaded, the thrust vector requires to be aligned in the same longitudinal vertical plane as the center of mass to achieve optimum steering control.

Automotive vehicles generally, when fitted with the devices according to the invention and when suitably adjusted, not only obtain significant reduction of vehicle tilt to the right side and minimal or negligible "squat," but have substantially equal wheel loading of both rear wheels as well as unimpaired freedom of the axle housing to be displaced up or down in normal springing. As a result extremely high acceleration of the vehicle and full steering control is made possible when both rear wheels take a more nearly equal share of the vehicle weight on application of large drive torque, and wheel hop and resulting damaging stresses are greatly reduced of made nonexistent. Moreover, the mounting of the beams does not in any way alter the spring coefficient of the leaf springs.

The fitting of the invention to passenger automobiles is moreover advantageous in obtaining improved traction on poor road surfaces such as ice, snow, loose gravel, or mud, and in facilitating cornering. The beam structures according to the invention moreover serve to reduce total leaf deflection during overload states so long as a substantial torque is exerted on the rear axles.

The invention may be the better understood from a careful reading of the following description of its preferred embodiments in conjunction with the accompanying figures of the drawing, wherein:

FIG. 4 is a perspective view of one form of suspension linkage according to the invention fitted on one side on a rear axle housing;

FIG. 5 is a side elevational view in enlarged scale of the suspension linkage of FIG. 4;

FIG. 6 is a side elevational view of an alternative embodiment;

FIG. 7 is a plan view of the compression member of the embodiment of FIG. 6;

FIG. 8 is a side elevational view of a modified rear axle housing combined with an integral suspension linkage according to the invention; and FIG. 9 is an end elevational view of the embodiment of FIG. 8 taken on section 9—9.

Figure 1:
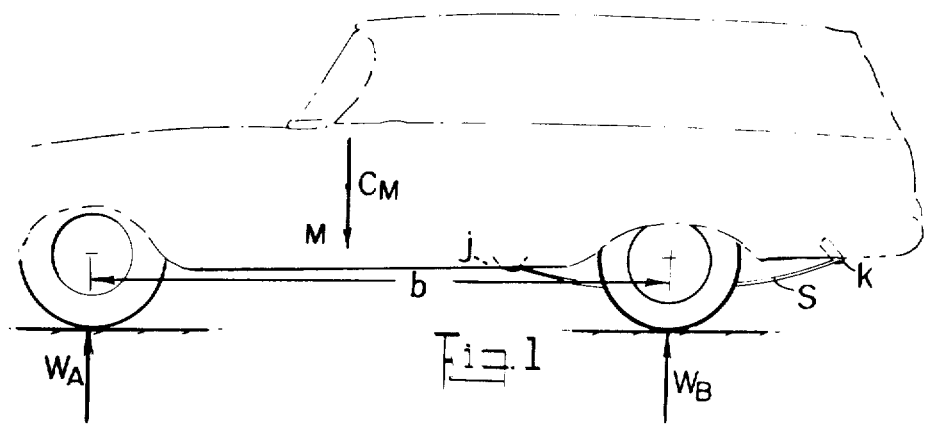
FIG. 1 is a side elevational view of an automobile vehicle forming part of a preliminary statement of the problem with which the invention is concerned.

A vehicle shown in side elevation view in FIG. 1 has a wheel base $b$ measured between the centers $x$, $y$, of ground-contact tire areas of the rear and front pneumatic tyres $V_R$, $V_F$ which are subjected to respective loads $W_B$ and $W_A$. The center of mass $C_M$ of the vehicle is generally assumed to lie intermediate the front and rear wheel sets, and to be somewhat above the respective horizontal transverse axes $m$ and $o$. The vehicle is provided with semi-elliptical stacked leaf springs S connecting the rear axle housing H with frame F, at front and rear attachment points $j$, $k$.

It will be assumed that a torque Q, graphically depicted by the broad hollow arrow so designated, is applied between the vehicle frame F and the axle about its axis extending through $o$, coaxial with the rear wheels $V_R$. The magnitude of the torque is further assumed to be such that at a radius arm extending distance $b$ from the axis $o$, the upward force is equal to $-W_A$ so that nil load is imposed on point $y$ by front tyres $V_F$.

At the same time, by definition, a tangential force T is exerted by the rear tyres through their ground-contact areas, of a magnitude such that the product of this thrust force when multiplied by the radius arm $h$ is equal to the torque and hence:

$$-W_A.b = T.h = Q$$

(1)

Since a system of machine members subjected to a torque originating within the system will experience pairs of forces wherein the directions of the forces of each pair are parallel and not co-planar, it may be shown that there are two principal pairs of such forces acting on the vehicle member, as follows:

Considering the respective vertical and horizontal forces $-W_A$ and T, it may be noted that for equilibrium of the vertical pair producing a couple about point $o$ there must be an equal downward force $W_A$ loading the rear axle, i.e. acting through point $o$; similarly, it may be noted that for equilibrium of the horizontal pair of forces producing a couple tending to angularly displace the rear wheels about an axis in $o$, a horizontal force $-F_t$ must be directed into the frame, equal in magnitude to T. This thrust is exerted through the leaf spring S acting as a compression strut, into pin $j$ linking the spring end with frame F.

Because the vehicle has mass M, its inertia exerts an opposing force $F_t$ such that $$-F_t = M.a = {}^Q/_h$$

(2)

where:

$a$ is the acceleration imparted to the vehicle,
$M$ is total vehicle mass:

$$\frac{W_A + W_B}{g}$$

$g$ is the gravitational acceleration, i.e. 32.2 ft/sec².

For purposes of simplification, it is assumed that point $j$ lies essentially at the same height as the axis $o$.

Figure 2:
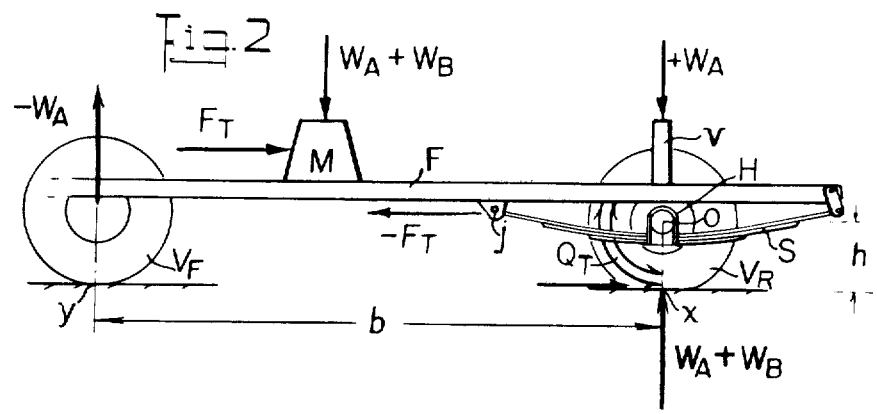
FIGS. 2 and 3 are diagrams based on FIG. 1 illustrate torques, moment arms, angular displacements, and vertical and horizontal forces acting as an axle housing arising out of application of torque via the drive train.

In FIG. 2 a frictional guide $v$ has been illustrated restricting the movement of the housing H to free vertical reciprocation in the frame F. The purpose of this arrangement is to simplify the torque analysis by avoiding sinusoidal deformation of the semi-elliptical spring suspension when axle housing H is subjected to the couple complementing torque Q applied to the wheel axles. In effect this arrangement leaves unaltered the vertical displacement of the housing and spring system, i.e. normal springing is preserved.

From a consideration of the total load ($W_A + W_B$) transferred to the rear wheels, it will be seen that thrust T will be large if the coefficient of tire/road friction C is large enough:

$$T = Q/h = C \cdot (W_A + W_B) \qquad (3)$$

The relation (3) signifies that the entire torque Q may be applied without occurrence of slip, i.e. without tire squeal and abrasion loss of rubber. For a vehicle of road weight 3,400 lbs., assuming a coefficient C of 0.8 for dry, unpolished concrete in contact with new, clean tire surfaces, the maximum torque, setting a value $h$ of 1 foot, may approach:

$$Q = 3,400 \times 0.8 \times 1 \text{ lb.-feet},$$

which is 2,820 lb.-feet.

In the first instant of application of the torque Q it would be expected that a vehicular acceleration of large magnitude should be realized. However the system illustrated would suffer from the problems with the solutions of which the present invention is chiefly concerned, namely that as a result of such application of large torque a periodic wheel hop and intermittent free spinning of one driving wheel VRR will be set up, damaging the tires and drive train components, and causing erratic steering. The reasons will be made clear by reference to FIG. 3.

Figure 3:
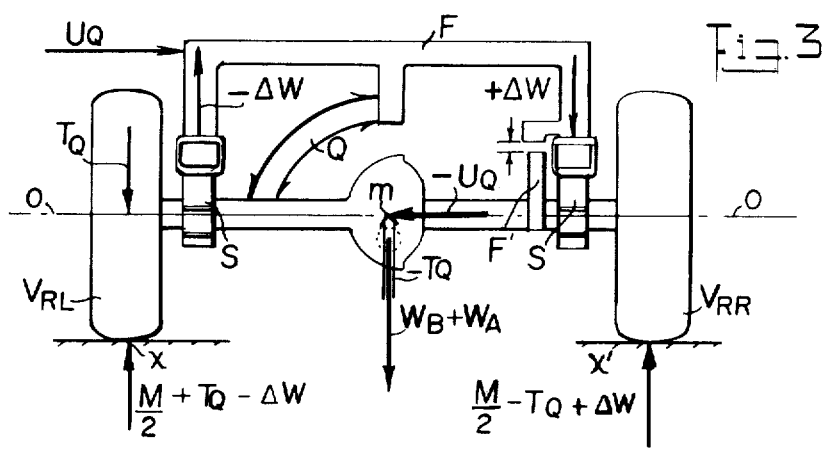

The rotational sense of the drive train is assumed to be counterclockwise as viewed in the rear elevational view, FIG. 3. The torque Q applied to the rear axles must set up two pairs of non-coplanar horizontal and vertical forces representing the sense of the positive and negative couples acting on the frame F and on the axles. A vertical downward thrust $T_Q$ acts through the wheel VRL upon point $x$ in the road surface and complementary upward thrust $-T_Q$ may be shown to act upwardly through the mid-point $m$. At the same time, the frame experiences a horizontal thrust $U_Q$ directed into the engine supports, and the point $m$ must have applied a counter-force $U_Q$.

Since the wheel base $b$ is longer than the track width $2r$, the magnitude of $T_Q$ may be shown to be correspondingly greater than the magnitude of $W_A$ and because this upward force may be assumed to be transferred to the right wheel as housing H pivots about point $x$ under the left tire, the right tire VRR will tend to be lifted against the spring force of its leaf springs entirely clear of the roadway contact point $x'$.

In the abscence of compensating mechanisms effective to maintain equal traction at both rear wheels, the differential will be subjected to high shock loads attending the periodic lifting and dropping of the right rear tire which will alternately experience free spinning and road contact braking, accompanied by alternate gripping and slipping of the left tire.

The vehicle frame F may be shown to tend to rotate clockwise as viewed from the rear under the effect of horizontal thrust $U_Q$, causing the right-hand side of the frame to be depressed, displacing downwardly the right leaf spring assembly and thus applying a load fraction $[+\Delta W]$ to the right rear wheel, and simultaneously decreasing loading at the left wheel.

The wheel loadings under applied torque may be computed as:

Load at VRl:

$$\frac{W_A + W_B}{2} + T_Q - \Delta W \qquad (4)$$

Load at VRR:

$$\frac{W_A + W_B}{2} - T_Q + \Delta W \qquad (5)$$

If a coupling member F' is now interposed between the housing H and the vehicle frame F in such manner as to cause an adjustable direct load proportional to the torque component $T_Q$ to bear on the right - hand end portion of the housing it will be seen that the anticlockwise angular displacement of the housing about a longitudinal axis will be resisted, and the quantities $[-\Delta W]$ and $[+\Delta W]$ eliminated.

Coupling member F' practically will be realizeable as a rigid beam element having a degree of resilience to minimize shock. Thus a relatively large portion of $T_Q$ may be transferred to the right rear wheel. Hence, the total vehicle weight $(W_A + W_B)$ will be more nearly equally divided between the rear tyres, preserving ground-contact of the right tyre whatever the applied torque. As a result, erratic steering under high acceleration and wheel hop are virtually eliminated. As proof of the improved performance made possible, tests conducted with a late model passenger sedan having an engine of 428 cubic inch displacement, fitted with wide tread tires and corrective suspension linkages embodying the invention, have demonstrated acceleration from standing start to complete a run of 0.25 miles in elapsed time of 11 seconds, during which time neither rear wheel showed any slipping and steering control was excellent.

Referring to FIGS. 4 and 5, an embodiment of the corrective suspension linkage according to the invention comprises a unit 10 having a lower member 11 in the form of tubular steel body having its rearward portion rigidly affixed under the housing H and extending horizontally along spring stack S. A resilient block 12 carried on the upper side of the free end of body 11 is disposed near to the under surface of spring S so that a small rotational displacement of the housing about axis o—o on application of torque via drive shaft 13 to differential 14 and axles 15 will cause the block to engage the spring. The body 11 is rigidly and strongly clamped to the housing by U-bolts 16 having extended threading along the legs thereof. Nuts 17 threadedly engaging the legs exert clamping pressure to lock straps 18 against the leaf stack just ahead of and to the rear of the axle - housing saddle 19 and U-bolts 20 by which the stack is conventionally secured to the housing.

At the lower ends of the U - bolts 16, pairs of nuts 20' threadedly engaging the bolt end portions on both upper and lower sides of brackets 21 and 21' welded on the body 11, enable adjustment of both the vertical spacing of the body with respect to the leaf spring and its relation to the horizontal.

Body 11 and its mounting devices may be made adequately strong to serve as a true cantilever beam acting as a torque arm extension of the housing capable of lifting the forward end of the vehicle. However, a significant reduction of the weight of the unsprung drive components may be effected by arranging one or more tension elements 22 which have their ends secured in forward brackets 23 and rearward brackets 21' and pass over housing H. The compound beam so realized permits tubular body 11 to be made of relatively light construction. A pair of ⅜ inch rods 22 as shown combined with a 2-inch square tubing body of wall thickness 0.087 inch has proven to be amply strong in severe passenger automobile service.

The tension rods 22 have their ends threaded and inserted at right angles through planar flange portions 24 and 25 respectively of forward brackets 23 and rearward brackets 21' so disposed as to provide uniform bearing areas for pairs of adjustment nuts 26 which engage the threaded ends and clamp opposite faces of the brackets. When the compound cantilever beam so formed is swung clockwise as viewed in FIG. 5, the portion between brackets 23 and 21 is subjected to compressive stress, while the bending moment in this portion is substantially reduced.

A reverse rotation of the housing, in anti - clockwise sense in FIG. 5, also tends to cause spring wrap-up but the inflection of the "S" curve is opposite to that due to applied drive torque. An upwardly elongate U-member 27 having the lower ends of its leg portions threaded and extending through pierced brackets 23, is adjustably mounted by pairs of clamping nuts 28 threadedly engaged on the legs to provide a predetermined clearance between the bar of the U and the upper surface of the spring S. During extreme braking, the unit assumes a limiting position indicated by the dashed outline of the forward part of leaf spring S, with the bar of member 27 bearing down on the upper surface. The clearance should normally be sufficient to permit free up-down displacement in ordinary riding, but not so great that wheel hop can arise in severe braking.

In an alternative embodiment, the elements 22 comprise a single length of rod bent to U shape and having the legs folded over the housing, the bar of the U passing under the leaf stack immediately adjacent the housing saddle clamp plate 30, as may be understood from FIG. 5 showing that portion of the rod extending downwardly from spring S in dashed outline.

The unit of FIGS. 4 and 5 has been illustrated deliberately with a large spacing between the under - surface of the leaf stack and body 11 for clarity of illustration and represents a corrective linkage preferred for use with extremely large-torque systems and large-diameter drive wheels as in drag racing. It is to be understood that such clearance may be considerably decreased and that a minimum spacing is desirable for reducing the impediment such units might present when fitted on passenger automobiles driving on snow or mud.

An alternative preferred embodiment having utility primarily for use on higher - powered sport cars comprises a compound cantilever beam unit 40 as depicted in FIGS. 6 and 7.

The compression strut 31 of the beam is formed as a nearly - flat bar or strap, which is preferably of spring steel, and is mounted clamped against the lower side of spring stack S by means of the conventional axle - housing connection, i.e. housing saddle 19, lower plate e30, and U-bolts 20 and nuts 20'. The strut is rigidly held to prevent fore - and -aft displacement by bolt 32 passing through aperture 33 and spring-stack S. Near the forward end of the strut which droops slightly, a pair of spaced parallel transverse bends 34 and 35 each nearly a right angle form a planar bearing portion 36 to the forward surface of which a short transverse bar 37 is welded, having holes 38 drilled in projecting ends thereof on each side to receive the inserted threaded ends of tension rod 22. The rod is a U - shaped unitary length of round stock having the bar 37 thereof engaged under the leaf stack just behind plate 30 and having the legs bent over the housing to form a triangular cantilever beam capable of exerting large lift by the horizontal end portion 39. Adjustment of spacing is effected by pairs of nuts 26 as for the tension element of FIG. 5. A resilient block 41 engaged in hole 42 is adjustably spaced from the under-side of spring S by adjusting nuts 26; the height of the block 41 may also be regulated as desired by interposing washers or the like. Such correction unit inherently opposes anti - clockwise rotation due to severe braking, but does not degrade up - down springing or alter the ride, while serving also as an overload spring.

Referring now to FIG. 8, a corrective unit 50 which is a onepiece arm integral with and extending forwardly from housing H comprises a U - channel section cantilever beam having a web portion 51 slightly wider than the leaf stack S disposed horizontally along the lower side of the beam, joined to the housing by welding and projecting nearly tangentially from the housing lower profile. Side flanges 52 taper in height forwardly, and at their rearward extremity are welded strongly to the housing which is otherwise conventionally clamped on saddle 19 and spring stack S by U - bolts 20 engaging plate 30. In designs providing a web wider than the spring leaves the forward end of web 51 is apertured to receive the threaded ends of both legs of U - bolt 53, the bar 54 of which depends under the forward portion of the leaf stack. A resilient sleeve 55 carried by the bar 54 is disposed to have an adjustable clearance between the under surface of the stack and the sleeve, by regulating the setting of nuts 56 threadedly engaging the bolt ends on opposite faces of the web.

To cushion shock due to braking-induced rotation of the housing, which rotation is anti - clockwise as viewed in FIG. 8, a resilient block 57 is affixed under web 51 between the bolt legs. It will be apparent that such construction is well suited to embodying the principles of the invention at the time of manufacture of an automotive vehicle, whereas the devices of FIGS. 4 and 6 represent accessories which may readily be fitted to existing vehicles.

An embodiment for lower powered vehicles, shown in FIG. 9, has a web 51 of less width than the spring leaves and U - bolt 53 is adjustably carried by a strap 58 welded under the beam web.

ADJUSTMENT

The mounting and adjustment of the corrective suspension linkages described to obtain more nearly equal loadings of the rear wheels of an automobile having semi-elliptical leaf springs and a longitudinal drive shaft, requires only that the spring-to beam spacings of the free ends of the respective cantilever beams fixed on the housing be unequal while torque is not applied, and that the larger spacing be provided at the wheel not subject to hop. This means that for conventional machines the right - hand beam end is positioned closer to or contiguous with or may even be resiliently engaged against its leaf stack prior to application of torque, and that the left - hand beam should engage its stack only when a torque greater than predetermined torque has been applied. In general for a given vehicle loading the clearance at the left spring stack should permit a housing rotation of a few degrees before the left beam applies lift to the springs; however this clearance is not critical, and the advantages of the invention may be realized by settings which delay lift of the left spring until a rotation of 10° or 12° has developed, provided that each beam causes lift of its associated spring sufficient to maintain nearly equal traction at both wheels. A predetermined pre-loading of the right beam may be provided to offset any initial tilting of the vehicle to the right on sudden application of torque.

It may be recognized that loss of traction at one or both rear wheels may result from a number of road surface and tyre states not controllable or correctable by the practice of the invention.

I claim:

1. In an automotive vehicle of the type having a chassis, a transverse drive axle housing, a pair of ground-engaging rear wheels driven by axles rotatable in said axle housing, and a pair of longitudinal leaf suspension springs having their medial portions attached respectively to left and right terminal portions of said axle housing and having their ends linked with said chassis, said leaf suspension springs being subject to bending due to vehicle loading and subject also to flexing by torque-induced rotative movement of said axle housing about longitudinal and transverse axes on application of predetermined forward driving torque to said axles; suspension-modifying elements for equalizing driving wheel traction comprising:

a pair of longitudinal beam members secured by their one ends to said vehicle axis housing adjacent respective points of attachment of said leaf suspension springs thereto, said beam members extending forwardly in vertical alignment with their associated leaf springs, the lengths of said elements being such that their other ends are disposed adjacent respective forward portions of the associated springs, bumper elements carried by said other ends of said beam elements having thrust surfaces, and means to adjustably space said thrust surfaces from associated leaf springs in a direction opposite to the direction in which said forward ends are displaced by said torque-induced rotative movement of said axle housing.

2. Traction-equalizing suspension-modifying elements as set forth in claim 1 wherein the relative spacings of thrust surfaces of respective bumper elements are such that in the absence of driving torque said thrust surfaces are out of contact with their associated leaf springs and such that when forward driving torque is applied to said axles which is not greater than said predetermined forward driving axle torque one of said bumper elements is rotated sufficiently to exert lifting force on its associated spring offsetting wheel ground pressure loss due to said rotative movement and the other bumper element exerts a lesser or nil lifting force on its associated spring.

3. Traction-equalizing suspension-modifying elements as set forth in claim 1 wherein the relative spacings of thrust surfaces of respective bumper elements are such that in the absence of driving torque each bumper element exerts significant lifting force on its associated spring and such that when said driving torque is increased to equal or exceed said predetermined forward driving axle torque the respective lifting forces exerted on the springs are unequal and effective to substantially equalize wheel ground pressures.

4. Traction-equalizing suspension-modifying elements as set forth in claim 1 wherein each bumper element carries an elastomeric resilient body presenting a thrust surface to the associated leaf spring.

5. Traction-equalizing suspension-modifying elements as set forth in claim 2 wherein the point of application of the lifting force lies in the forward one-third length portion of the leaf spring adjacent the forward link connection with the chassis.

6. Traction-equalizing suspension-modifying elements as set forth in claim 1 wherein said beam members each comprise a compound beam having a rigid compression element demountably fixed to the axle housing and a tension element passing contiguously over said axle housing and secured by its ends to end portions of said compression element.

7. Traction-equalizing suspension-modifying elements as set forth in claim 1 wherein said beam members comprise a compound beam having a lower compression element demountably fixed to the underside of the axle housing and an upper tension element, said tension element extending over said axle housing and being secured by its rearward end as a loop and engaging the underside of said suspension spring and being secured by its forward end to the forward part of said compression element.

8. Traction-equalizing suspension-modifying elements as set forth in claim 6 wherein said compression element comprises a channel or tubular section fastened to said suspension spring under the medial portion thereof.

9. Traction-equalizing suspension-modifying elements as set forth in claim 6 wherein said longitudinal beam members comprise vertically-resiliently deflectable bars, said bars being clampedly secured by their rearward ends to the undersides of said suspension springs and each having an inflected portion adjacent the forward end, said inflected portions presenting an area generally normal to said tension element, and each tension element comprises a pair of rod elements spaced one on each side of the associated bar and adjustably secured by their forward ends to said normal area portion.

10. Traction-equalizing suspension-modifying elements as set forth in claim 1 wherein said longitudinal beam members comprise rigid compression elements fixed on said axle housing and directed horizontally forwardly of and disposed above said suspension springs, and the forward ends of said rigid compression elements each carry a depending "U"-member having the bar of the "U" disposed transversely below the associated suspension springs and the leg portions adjustably secured to the rigid compression element on opposite sides of said springs.

11. Traction-equalizing suspension-modifying means as set forth in claim 10 wherein the bar of the "U" carries a resilient cushioning element.

12. Traction-equalizing suspension-modifying elements as set forth in claim 8 wherein said compression element is provided with brackets and said tension elements comprise a pair of rods having end portions threadedly adjustably secured in said brackets for adjustment of the attitude of said compression element.

13. Traction-equalizing suspension-modifying elements as set forth in claim 8 wherein said compression element is provided with brackets and said tension elements comprise a single rod bent as a "U" having the legs thereof extending forwardly over the axle housing and having their end jportions threadedly adjustably secured in said brackets for adjustment of the attitude of said beam member, and having the bar of the "U" contiguously engaging the underside of the suspension spring on the rearward side of the axle housing.

14. Traction-equalizing suspension-modifying elements for improving traction and for controlling drive-torque-induced spring wrap-up, squat, and roll in an automotive vehicle having a chassis, a powered drive system in said chassis, a pair of ground-engaging rear wheels driven from said drive system, a transverse drive axle housing, and a pair of semi-elliptical leaf suspension springs having their medial portions fixed respectively on the left and right sides of said axle housing, said suspension-modifying means comprising a pair of like cantilever beam members adapted to be demountably secured on said axle housing in vertical alignment with respective leaf springs, said beam members having a length such that when mounted counter-rotation of said housing which is induced by application of drive torque to said wheels causes said beam members to engage forward portions of respective leaf springs and to apply lifting forces thereto to transfer a part of the vehicle weight to said driven wheels, and means to adjust the relative spacings of said beam members from their associated leaf springs for correcting inequality of weight transfer produced by said counter-rotation.

* * * * *